United States Patent [19]
Ting et al.

[11] Patent Number: 5,948,993
[45] Date of Patent: Sep. 7, 1999

[54] AMPLIFIED SHEAR TRANSDUCER

[75] Inventors: Robert Y. Ting, Orlando, Fla.; William B. Carlson, Alfred, N.Y.

[73] Assignee: The United States of America as represented by the Secretary of the Navy, Washington, D.C.

[21] Appl. No.: 09/034,771

[22] Filed: Mar. 2, 1998

[51] Int. Cl.$^6$ ........................................... G01B 7/16
[52] U.S. Cl. .................................. 73/777; 73/841
[58] Field of Search ............................ 73/777, 841

[56] References Cited

U.S. PATENT DOCUMENTS

| | | | |
|---|---|---|---|
| 4,523,243 | 6/1985 | Billington | 360/113 |
| 5,010,269 | 4/1991 | Hikita et al. | 310/313 B |
| 5,431,057 | 7/1995 | Zimmer et al. | 73/724 |
| 5,544,529 | 8/1996 | Mitani et al. | 73/716 |
| 5,623,096 | 4/1997 | Bandyopadhyay | 73/147 |
| 5,834,650 | 11/1998 | Kim | 73/651 |

*Primary Examiner*—Max Noori
*Attorney, Agent, or Firm*—Michael J. McGowan; Prithvi C. Lall; Robert W. Gauthier

[57] ABSTRACT

A 15 mode piezoelectric sensor with mechanical amplification is provided. The sensor consists of two piezoelectric members mounted on an electronically inert, rigid substrate. The two members have an electronically inert amplification device connected between them. When acoustic energy passes through the two members, they develop an electric charge which results in the upper ends of the members moving away from each other. Since the lower ends are anchored in the substrate, this causes a shearing response in the members. The shearing is amplified by the attached amplification device, yielding a strong piezoelectric response. In detection mode, incoming acoustic waves cause a mechanical flex in the attached amplification device. The flex of the amplification device causes a shearing response in the two attached piezoelectric members. This shearing causes a generation of electric charge.

20 Claims, 7 Drawing Sheets

33 MODE

FIG. 1a

31 MODE

FIG. 1b

15 MODE

AMPLIFIED SHEAR TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The invention is related to the field of air and hydroacoustic transducers and in particular to piezoelectric shear transducers.

(2) Description of the Prior Art

Distortional piezoelectric devices have been used in a variety of circumstances where detection of air and waterborne acoustic energy is required.

In particular, piezoelectric transducers have been widely used as a part of sonar systems. When the sonar is in active mode, an AC voltage is applied to a piezoelectric transducer. Each voltage change causes the piezoelectric transducer to generate a mechanical response. Rapidly changing voltage, (such as an AC cycling), causes a mechanical response to occur multiple times a second which can then be amplified to produce an acoustic. wave. This wave is the sonar "ping" used to detect targets in active sonar.

In passive mode sonar, the transducer is not used to transmit acoustic signals, but is, instead, used to receive incoming acoustic waves. In this mode, acoustic waves cause mechanical movements in the piezoelectric transducer which are converted to electrical signals. The electrical signals can then be processed by sonar displays, computerized tracking devices, and other electrical processors. The detection mode of the transducer is also used in active sonar to detect reflected sonar pulses. Often, the same transducer is used both to generate pulses and receive reflected signals.

A major design goal of piezoelectric transducers when used as an element of sonar systems has been to provide high sensitivity. Higher sensitivities allow the sonar system to detect and respond to lower energy return signals. Additionally, optimal transducers must generate and respond to a wide frequency range of signals. Furthermore, the transducer also must be easily configured for installation in a variety of devices.

Figure 1A:
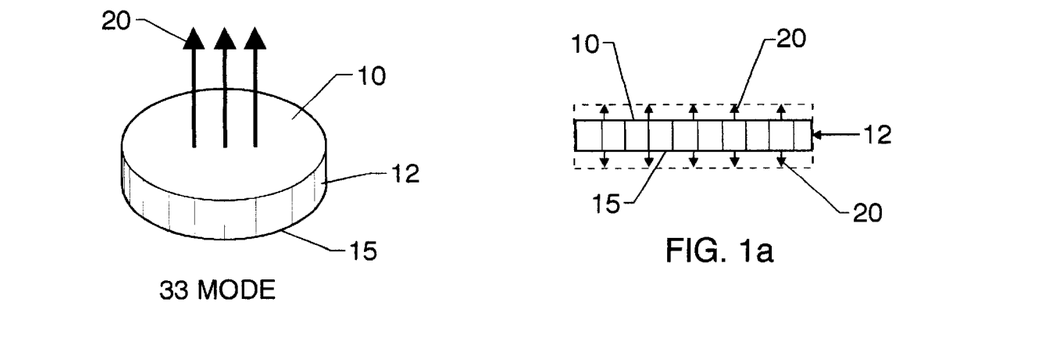
FIG. 1a is a perspective and top view of a piezoelectric disc operating in 33 mode.
Figure 1B:
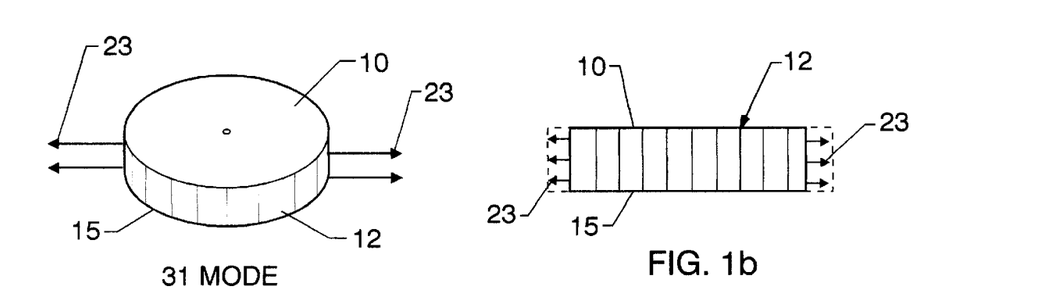
FIG. 1b is a perspective and top view of a piezoelectric disc operating in 31 mode.
Figure 1C:
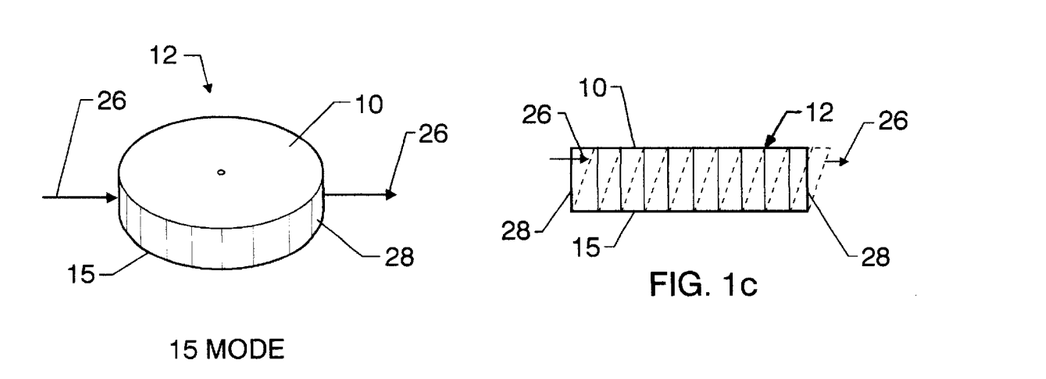
FIG. 1c is a perspective and top view of a piezoelectric disc operating in 15 mode.

Piezoelectric devices have three main modes of operation: a cross-sectional compression mode (33 mode), a lateral compression mode (31 mode) and a shear mode (15 mode). These three modes are depicted in FIGS. 1a–1c, respectively. In 33 mode, a circular disc is polarized so that the flat surfaces carry opposing charges. Piezoelectric response comes from the compression and expansion of the disc up and down toward the two polarized surfaces. In 31 mode, a circular disc is again polarized so that the flat surfaces carry opposing charges. Piezoelectric response now occurs due to expansion and compression of the disc in a direction perpendicular to the axis going through the charged surfaces, resulting in a movement of the entire disc edge in and out. In the final mode, 15 mode, the disc is again polarized so that the flat surfaces carry opposing charges. However, since the surface on the bottom end is now held in a fixed location and the top flat surface is allowed to move laterally, a shearing of the disc results, thereby generating an electric response. The mode numbers correspond to the piezoelectric coefficients $d_{15}$, $d_{31}$, and $d_{33}$. Research in piezoelectrics has shown that the shearing coefficient ($d_{15}$) is much larger, indicating a more efficient response to incident acoustic energy than either of the other two coefficients.

However, previous attempts have focused on the amplification of the first two modes of piezoelectric response. In large part, this has been so because the amplification of the shear piezoelectric response has been more difficult to achieve. Only in the first two modes has amplification been easily made possible. The use of the first two modes (often called dilatational piezoelectric devices) has resulted in transducers with a more limited sensitivity and higher frequency than could have been achieved by using 15 mode (distortional) piezoelectrics. Furthermore, these devices require a plane of symmetry to allow free movement of the transducer element, thus limiting the geometry of devices in which they may be installed.

SUMMARY OF THE INVENTION

Accordingly, it is an object of the present invention to provide a high sensitivity acoustic transducer.

It is a further object of the present invention to provide an acoustic transducer with a wider frequency sensitivity than current transducers.

A still further object of the present invention is to provide for the ability of operation in either an air or hydrostatic acoustic environment.

Another object of the present invention is to provide for mechanical amplification of the piezoelectric shear response.

Yet another object of the present invention is to provide a flexible design not requiring a plane of symmetry.

In accordance with these and other objects, the invention is a 15 mode piezoelectric sensor with mechanical amplification. The sensor consists of two piezoelectric members mounted in a mechanically stable substrate. The two members have a mechanical amplification device connected between them. When mechanically driven, the two members develop an electric charge which results in the upper ends of the members moving away from each other. Since the lower ends are anchored in the substrate, this causes a shearing response in the members. The shearing is amplified by the attached amplification device, yielding a strong mechanical response. In the detection mode, incoming acoustic waves cause a mechanical flex in the attached amplification device. The flex of the amplification device causes a shearing response in the two attached piezoelectric members.

BRIEF DESCRIPTION OF THE DRAWINGS

The foregoing objects and other advantages of the present invention will be more fully understood from the following detailed description and reference to the appended drawings wherein corresponding reference characters indicate corresponding parts throughout the several views of the drawings and wherein.

DESCRIPTION OF THE PREFERRED EMBODIMENTS

FIGS. 1a–1c show the three primary operating modes of piezoelectric transducers. FIG. 1a depicts 33 mode operation with a dilatational response in the direction indicated by arrows 20. In 33 mode, the electric response is generated from acoustic waves compressing electroceramic disc 12. The movement of electroded surface 10 relative to electroded surface 15 creates piezoelectric charge response.

The operation in 31 mode, depicted in FIG. 1b, is similar. Acoustic energy strikes electroceramic disc 12, compressing its sides, creating an effective movement in the sides of disc 12 as indicated by arrows 23. Piezoelectric response occurs due to the change in density of charge on electroded surface 10 and electroded surface 15.

The mode used in the present invention, 15 mode, is depicted in FIG. 1c. In 15 mode, one surface is held fixed allowing shearing of electroceramic disc 12. In FIG. 1c, surface 15 is rigidly fixed. Lateral force causes surface 10 to move to one side, as indicated by arrows 26, shearing the electroceramic disc 12. The piezoelectric response is generated due to charge accumulation on electroded surface 28.

Figure 2:
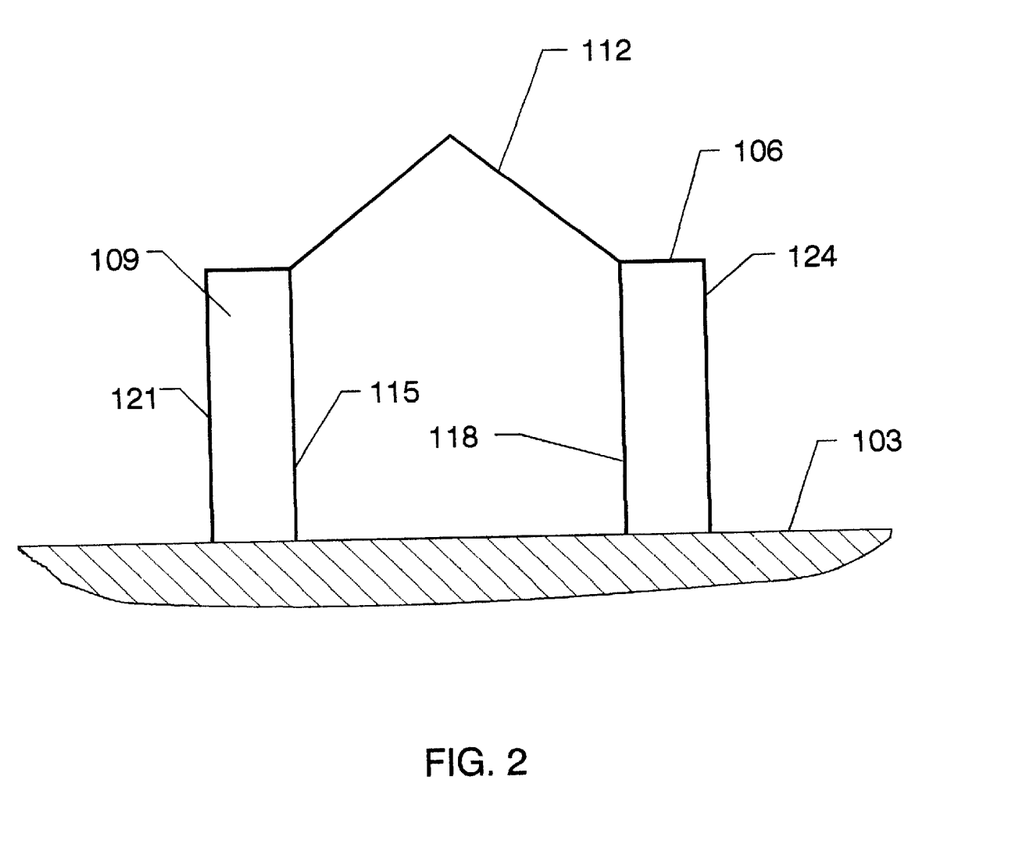
FIG. 2 is a side view of a single sensor element of the present invention.

Referring now to FIG. 2, a side view of the present invention is shown. Substrate 103 is provided as an anchor for the elements of the invention and is constructed of a mechanically stable material. Transducer elements 106 and 109 are rigidly attached by their bottom ends in substrate 103. Amplifier cap 112 is attached to the top ends of transducer elements 106 and 109. Transducer elements 106 and 109 are activated in such a way that the sides of each element have opposing charges and such that the like charged sides of each element face each other. For example, electrodes 115 and 118 have the same charge and face each other across the gap covered by amplifier cap 112. The opposing charge is sustained by electrodes 121 and 124. In this manner, transducer elements 106 and 109 are able to generate a piezoelectric response from mechanical interaction due to the 15 mode. It is important that electrodes on elements 106 and 109 are not shorted together, thus both substrate 103 and amplifier cap 112 are required to be constructed such that their attachment does not short electrodes 115 and 118 to 121 and 124.

Figure 3:
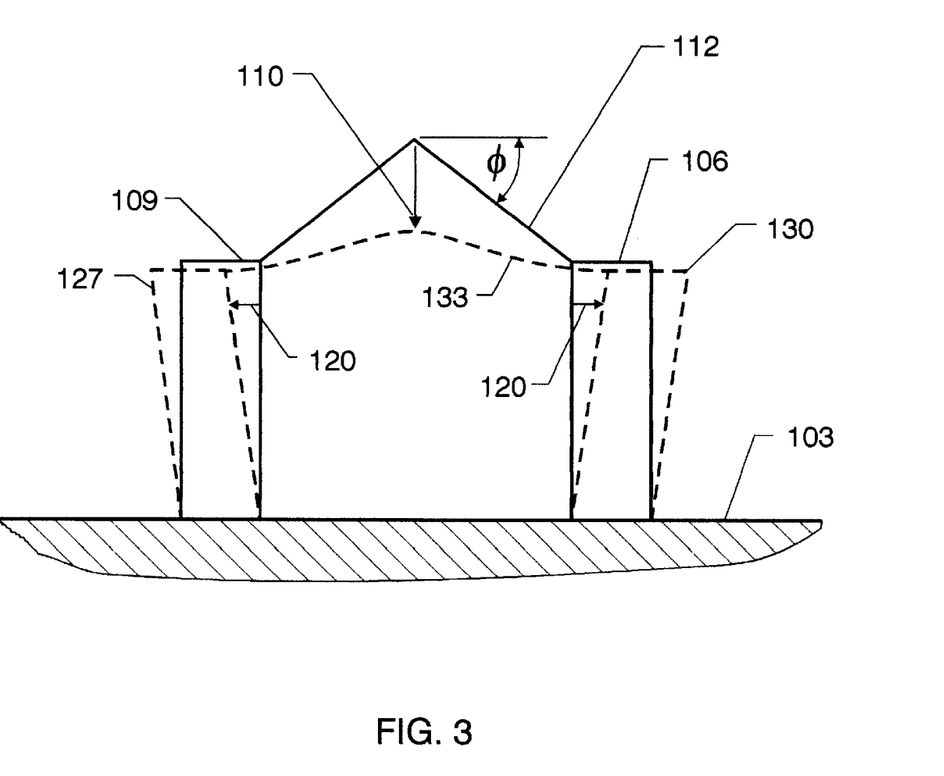
FIG. 3 is a side view of a single sensor element showing the operation of the invention.

Referring now to FIG. 3, a diagram depicting the operation of the present invention is provided. In passive mode operation, acoustic energy impacts on amplifier cap 112. Amplifier cap 112 is constructed of stiff material in order to ensure that vertical forces can be carried through a small angle of motion and develop a larger lateral force. Each wave causes amplifier cap 112 to flex slightly, as shown by arrow 110 to deflected amplifier cap 133. As deflected amplifier cap 133 moves downward, the angular bend in deflected amplifier cap 133 decreases, making the length of deflected amplifier cap 133 greater than the length of amplifier cap 112 as measured between elements 106 and 109. This increase in length laterally forces the top or second end of transducer elements 106 and 109 to move outward. Since the bottom or first ends of transducer elements 106 and 109 are firmly anchored in substrate 103, a true shearing is produced and transducer elements 106 and 109 move as indicated by the arrows 120 to sheared transducer elements 130 and 127, respectively. The shearing of transducer elements 106 and 109 places the elements in a state of distortion and results in an electric voltage.

In active mode, the operation of the present invention is similar but reversed. First, an electric voltage is applied to transducer elements 106 and 109. This electric voltage elicits a piezoelectric response in each member, causing the members to shear due to the rigid connection of transducer elements 106 and 109 to substrate 103. As the tops of transducer elements 106 and 109 move, as indicated by the arrows 120, sheared transducer elements 130 and 127, respectively result. This shearing pulls amplifier cap 112 down to the position indicated by deflected amplifier cap 133. When an alternating current voltage is applied to the present invention, the shearing described happens with sufficient frequency to generate an acoustic wave in either an air or water environment.

The angle φ of amplifier cap 112 relative to a straight horizontal line between the tops of transducer elements 106 and 109 should be less than 45 degrees for amplification. This limitation is required because the amplification factor is inversely related to the tangent of this angle. Specifically, $$1/N = \tan(\phi) \tag{1}$$

Thus, only when the angle is less than 45 degrees will an amplification factor of greater than one be produced. In the preferred embodiment, optimal results have been achieved when the angle is less than 20 degrees.

Figure 4:
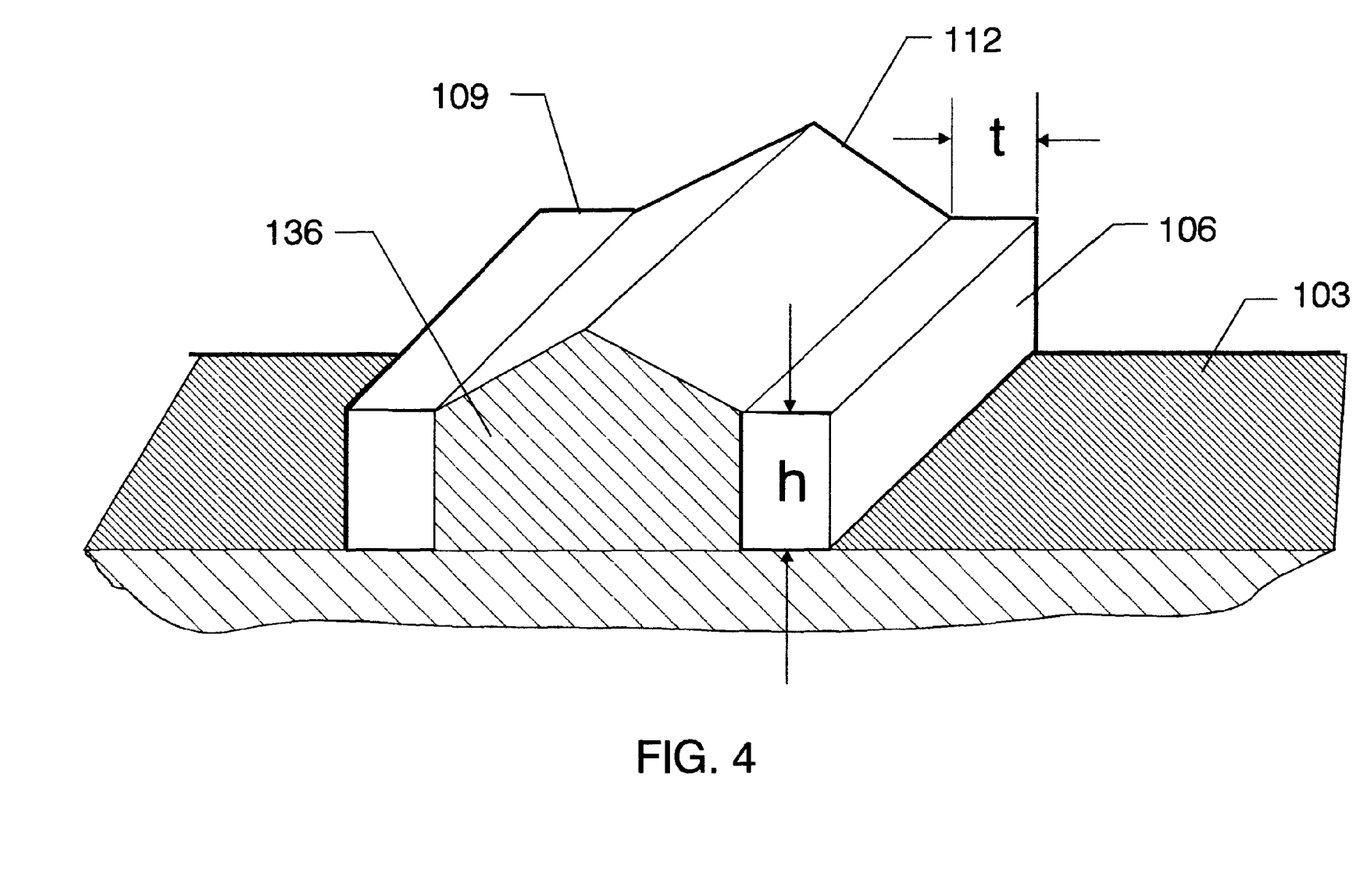
FIG. 4 is perspective view of the present invention.

Referring now to FIG. 4, a perspective view of the present invention is provided. Substrate 103 provides a rigid foundation upon which transducer elements 106 and 109 are mounted. Transducer elements 106 and 109 are rectangular blocks having a height h and thickness t. In order to prevent unwanted bending of transducer elements 106 and 109, the height to thickness ratio (h/t) is, preferably, less than five to one. In order to function effectively in high pressure environments, including hydrostatic applications, enclosing caps 136 may be placed at the side edges of both elements. Enclosing caps 136 allow the interior of the transducer to be sealed and held at a lower pressure than the surrounding environment. Enclosing caps 136 should also be flexible enough to allow movement of elements 106 and 109.

Figure 5A:
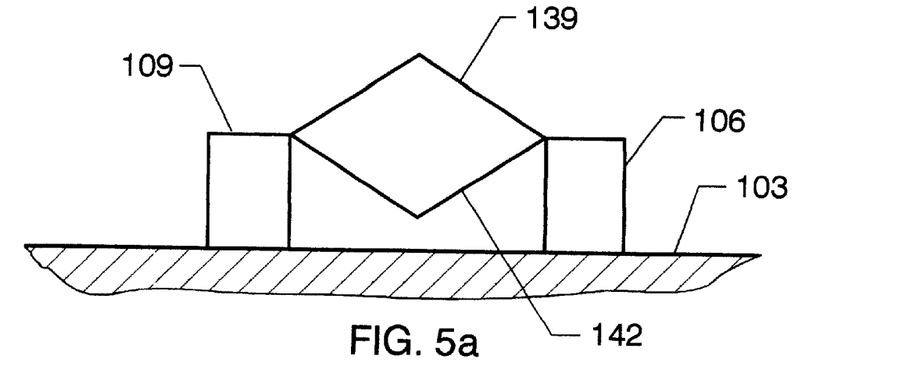
FIG. 5a is a side view of an alternate embodiment of the present invention using a balanced plate amplifier.
Figure 5B:
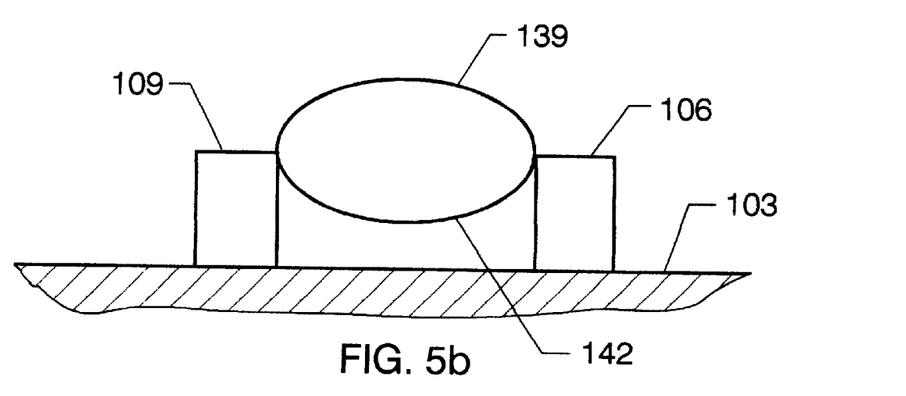
FIG. 5b is a side view of an alternate embodiment of the present invention using a elliptical amplifier.
Figure 5C:
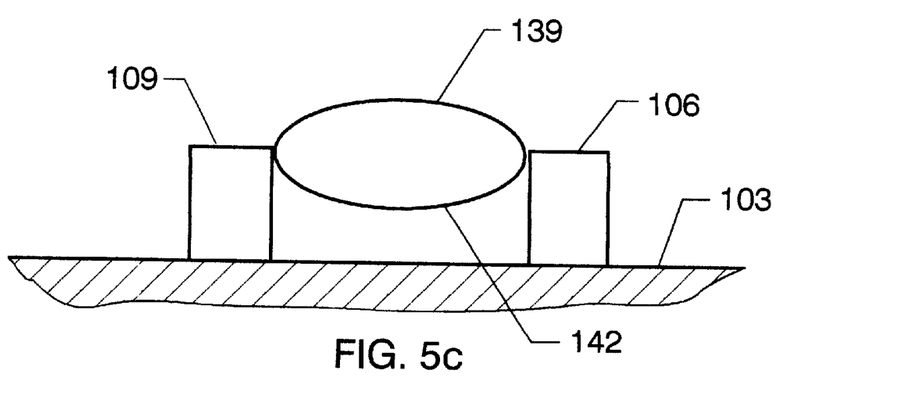
FIG. 5c is a side view of an alternate embodiment of the present invention using an arch amplifier.

Referring now to FIGS. 5a, 5b, and 5c, several alternate embodiments of amplifier cap 112 are depicted. Each figure illustrates a divided cap composed of upper amplifier cap 139 and lower amplifier cap 142. For hydrostatic applications, the pressure range need only be controlled between upper amplifier cap 139 and lower amplifier cap 142. Furthermore, the shape of the cap can be used to provide better response in a variety of pressure environments. FIG. 5a illustrates a balanced plate approach, with both upper amplifier cap 139 and lower amplifier cap 142 having a "v" shape. FIG. 5b illustrates an elliptical amplifier design, where upper amplifier cap 139 and lower amplifier cap 142 form a continuous ellipse. FIG. 5c illustrates an arch amplifier design, where upper amplifier cap 139 and lower amplifier cap 142 are arches stacked on top of each other. The pressure sensitivities of each design are well documented in prior art applications including pressure domes, bridge design, and building construction and may be manipulated to provide a proper pressure response by those skilled in the art within the scope of this patent.

Figure 6A:
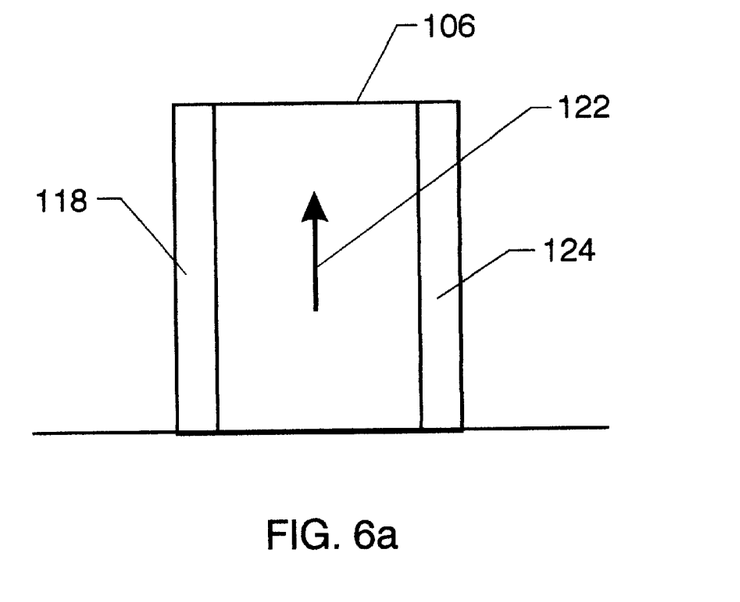
FIG. 6a is a detailed view of a single piezoelectric element using a monolith structure.
Figure 6B:
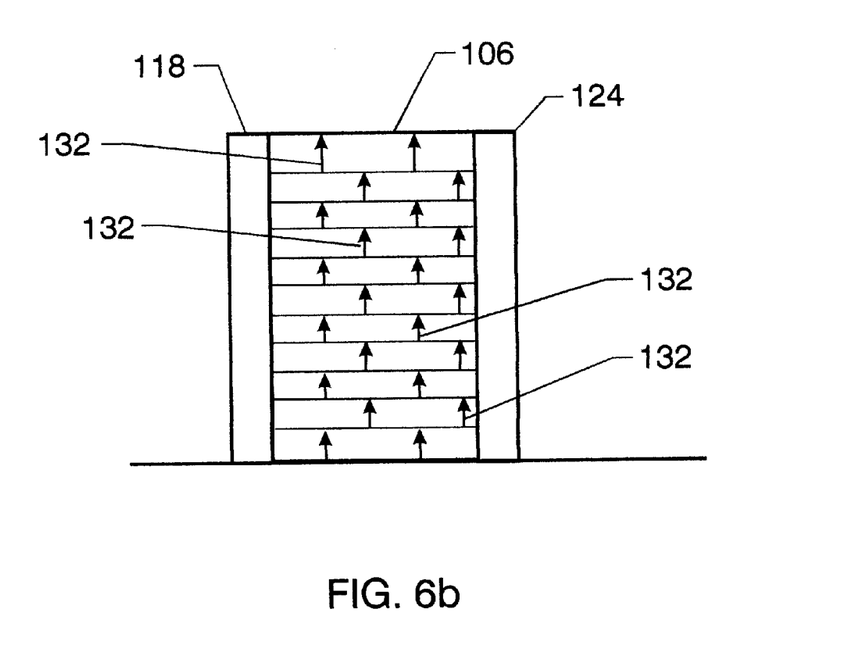
FIG. 6b is a detailed view of a single piezoelectric element using a layered structure.

Referring now to FIGS. 6a and 6b, two methods of construction of the transducer elements 106 and 109 are presented. In FIG. 6a, a standard monolith approach is depicted. In the monolith design, electrode 118 is on one side of transducer element 106 while the opposite polarity electrode 124 is on the other side. The interior of transducer element 106 is consistently poled in a single direction indicated by arrow 122. In FIG. 6b, an alternative layered approach is depicted. In the layered design, transducer element 106 is again enclosed by electrode 118 on one side and opposite polarity electrode 124 on the other side. However, the interior of transducer element 106 is now built of multiple layers all with a single direction of poling indicated by arrows 132 and bonded together.

Figure 7:
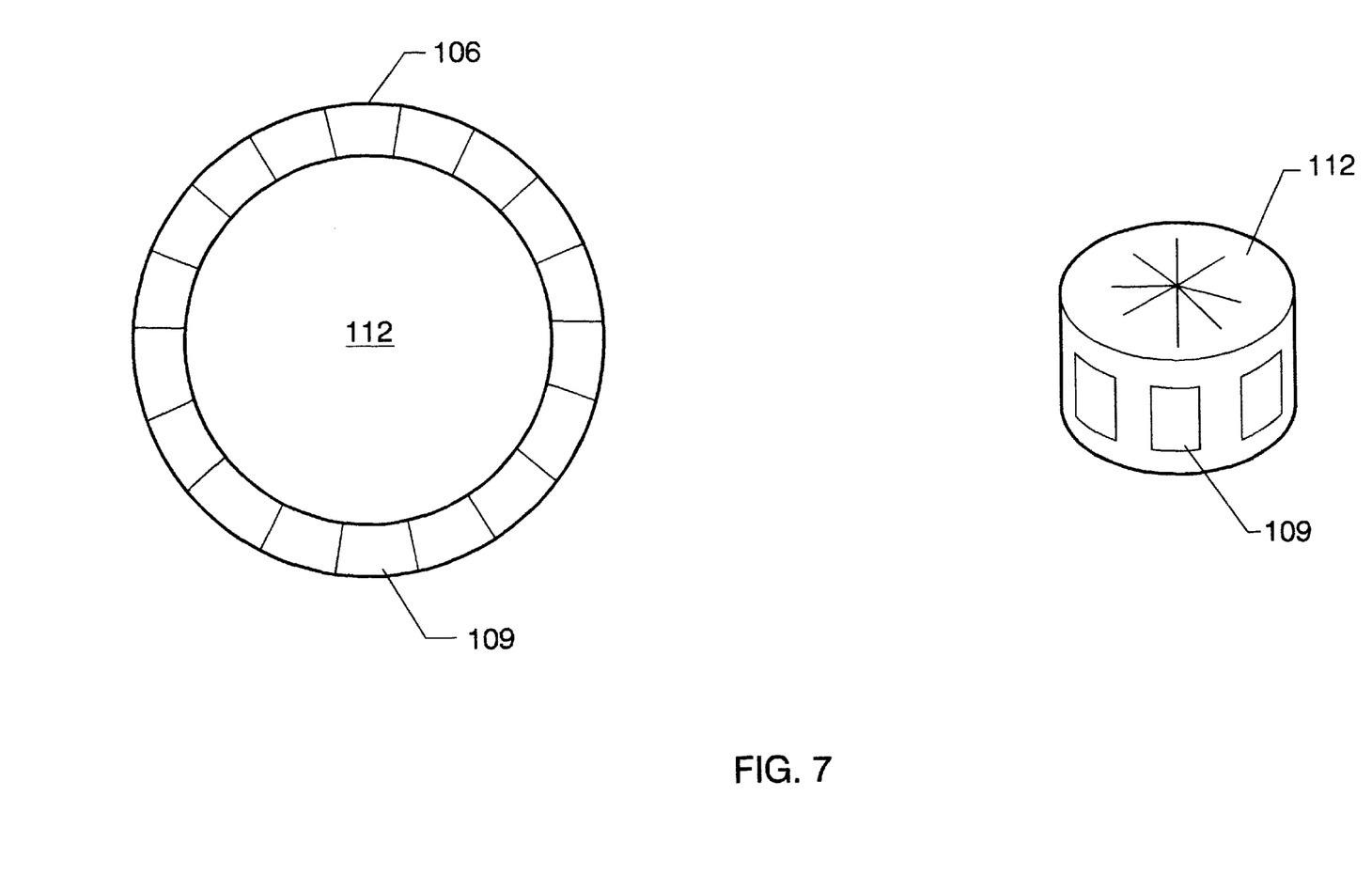
FIG. 7 is a top view and perspective view of an alternative ringer style embodiment of the present invention.

Referring now to FIG. 7, an alternate embodiment of the invention is shown. This "ringer" design is a radial sensor arrangement similar to that used often in the prior art. In this design, a continuous circle of transducer elements 106 and 109 replace the transducer pairs in the linear design. Effectively each transducer element 106 is paired with transducer element 109 located directly across the circle from it. Amplifier cap 712 having a slight cone shape covers the entire circular sensor array. In this design, pressure changes cause all transducer elements in the circle to shear outward. Furthermore, amplifier cap 712, transducer elements 109 and substrate 103 may form a sealed low pressure pocket for operation in hydrostatic environments, if desired.

In the preferred embodiment, the transducer elements 106 and 109 are constructed from electroceramic materials such as Lead Zirconate Titanate (PZT). However, any material which exhibits similar electromechanical behavior may be used within the scope of this invention. This includes electro-strictive materials such as lead magnesium nibate (PMN) and polyvinyl diflouride (PVDF). The preferred embodiment uses a stiff metal such as brass for amplifier cap 112 and aluminum for substrate 103; however, these materials may be modified within the scope of this invention.

Although the piezoelectric coefficient is greatest when the present invention is utilized in 15 mode, the device may be constructed such that it can be responsive to both dilatational (31 or 33 mode) and shear (15 mode) motions. In that case, incoming audio waves would compress transducer elements 106 and 109 towards substrate 103 in addition to shearing from the flexing of amplifier cap 112. This would create a dilatational response from the compression and a distortional response from the flex induced shearing. In this manner, the invention would generate piezoelectric voltage from both compression and shearing of the transducer.

The features and advantages of the present invention are numerous. The use of shearing instead of dilatational modes allows the transducer to be more efficient both in sensing and generating acoustic waves. The shear sensor mode also has a much lower frequency requirement for activation than 31 mode or 33 mode type sensors. Furthermore, for similar frequency requirements, the shear transducer may be smaller because of its lower mechanical stiffness. The shear transducer may also be surface mounted more easily because there is no requirement for complete freedom of movement of the bottom plane as required by previous dilatational devices. Also, since the shear transducer only moves in one direction, only freedom of movement in that single direction is required. This same longitudinal design allows for a simpler and smaller transducer than previous radial designs.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A shear transducer comprising:

a substrate;

a plurality of transducer elements each having a first end rigidly connected to said substrate, each transducer element having a second end remote from the first end, each transducer having opposing side edges extending from the first end at said substrate to the second end, the opposing side edges having oppositely charged electrodes thereon; and an amplifier cap attached to said plurality of transducer elements at the second end thereof.

2. A shear transducer as in claim 1 further comprising a plurality of enclosing caps rigidly attached to side edges of said transducer elements, the side edges extending perpendicular to and between the opposing side surfaces.

3. A shear transducer as in claim 1 wherein said plurality of transducer elements further comprises:

a first transducer element rigidly attached to said substrate and said amplifier cap; and a second transducer element rigidly attached to said substrate and said amplifier cap.

4. A shear transducer as in claim 3 wherein said amplifier cap is a "v" shaped cap rigidly connected to the second ends of said first transducer element and said second transducer element.

5. A shear transducer as in claim 4 wherein said "v" shaped cap subtends an angle in the direction of said substrate greater than 90 degrees and less than 180 degrees.

6. A shear transducer as in claim 3 wherein said amplifier cap further comprises an upper amplifier cap and a lower amplifier cap.

7. A shear transducer as in claim 6 wherein said upper amplifier cap and said lower amplifier cap are "v" shaped.

8. A shear transducer as in claim 6 wherein said upper amplifier cap and said lower amplifier cap form a continuous ellipse.

9. A shear transducer as in claim 6 wherein said upper amplifier cap and said lower amplifier cap are arches.

10. A shear transducer as in claim 1 wherein each transducer element of said plurality of transducer elements is consistently poled in a single direction.

11. A shear transducer as in claim 1 wherein each transducer element of said plurality of transducer elements is further comprised of a plurality of layers.

12. A shear transducer as in claim 1 wherein said plurality of transducer elements is arranged in a continuous circle and said amplifier cap is in the shape of a cone and covers the circle formed by said plurality of transducer elements.

13. A shear transducer as in claim 1 wherein said substrate is formed of alumina.

14. A shear transducer as in claim 1 wherein said plurality of transducer elements are formed of lead zirconate titanate.

15. A shear transducer as in claim 1 wherein said amplifier cap is constructed of a stiff metal sufficient to ensure vertical forces on said amplifier cap can be carried through a small angle of motion to develop a larger lateral force.

16. A shear transducer as in claim 1 wherein said amplifier cap is constructed of brass.

17. A shear transducer as in claim 2 wherein said amplifier cap, said enclosing caps, said plurality of transducer elements and said substrate form a sealed low pressure pocket.

18. A shear transducer as in claim 1 wherein said plurality of transducer elements also yield piezoelectric voltage when compressed.

19. A shear transducer comprising:

an electrically inert substrate;

a first transducer element having a first end, a second end, a negative electrode and a positive electrode, said first transducer element being rigidly affixed at the first end to said substrate;

a second transducer element having a first end, a second end, a negative electrode and a positive electrode, said second transducer element being rigidly affixed at the first end to said substrate; and a "v" shaped amplifier cap rigidly connected to the second end of said first transducer element and said second transducer element, the cap subtending an angle in the direction of the substrate greater than 90 degrees and less than 180 degrees.

20. A shear transducer comprising:

an electrically inert substrate;

a plurality of transducer elements having a first end and a second end, the transducer element being rigidly affixed at the first end to said substrate and rigidly affixed to each other forming a continuous circle, each transducer element having a negative electrode and a positive electrode; and an amplifier cap attached to said plurality of transducer elements at the second ends of said transducer elements; said amplifier cap further completely covering and enclosing the circle formed by said plurality of transducer elements.

* * * * *